US012462489B2

(12) United States Patent
Battiato et al.

(10) Patent No.: US 12,462,489 B2
(45) Date of Patent: Nov. 4, 2025

(54) BALLISTIC ANALYSIS METHOD AND RELATED ANALYSIS SYSTEM

(71) Applicants: ICTLAB S.R.L., Catania (IT); UNIVERSITA' DEGLI STUDI DI CATANIA, Catania (IT)

(72) Inventors: Sebastiano Battiato, Catania (IT); Antonino Barbaro Paratore, Paternò (IT); Oliver Giudice, Mascalucia (IT); Luca Guarnera, Catania (IT)

(73) Assignees: ICTLAB S.R.L., Catania (IT); UNIVERSITA' DEGLI STUDI DI CATANIA, Catania (IT)

( * ) Notice: Subject to any disclaimer, the term of this patent is extended or adjusted under 35 U.S.C. 154(b) by 12 days.

(21) Appl. No.: 18/724,240

(22) PCT Filed: Oct. 19, 2022

(86) PCT No.: PCT/IB2022/060034
§ 371 (c)(1),
(2) Date: Jun. 26, 2024

(87) PCT Pub. No.: WO2023/079395
PCT Pub. Date: May 11, 2023

(65) Prior Publication Data
US 2025/0014286 A1  Jan. 9, 2025

(30) Foreign Application Priority Data
Nov. 2, 2021  (IT) .......... 102021000027923

(51) Int. Cl.
*G06V 20/20* (2022.01)
*G06F 3/01* (2006.01)
(Continued)

(52) U.S. Cl.
CPC .............. *G06T 19/00* (2013.01); *G06F 3/014* (2013.01); *G06F 3/017* (2013.01); *G06F 3/04815* (2013.01); *G06F 3/04842* (2013.01); *G06F 3/04845* (2013.01); *G06T 2200/24* (2013.01); *G06T 2219/024* (2013.01)

(58) Field of Classification Search
CPC ...... G06F 3/011; G06F 3/017; G06F 3/04815; G06F 3/04845; G06V 20/20; G06T 19/00
See application file for complete search history.

(56) References Cited
U.S. PATENT DOCUMENTS

| 11,282,353 | B1* | 3/2022 | Fowler | ............. G08B 13/19613 |
| 2021/0102781 | A1* | 4/2021 | Lee | ........................ F41G 3/2694 |
| 2021/0270569 | A1* | 9/2021 | Purvis | ....................... F41G 3/26 |

* cited by examiner

Primary Examiner — Sanghyuk Park
(74) Attorney, Agent, or Firm — Bayramoglu Law Offices LLC

(57) ABSTRACT

A ballistic analysis method (multi-user) is provided, including the steps of preparing a virtual reality viewer conformed to be worn by an operator; providing a computer to which said virtual reality viewer is connected, wherein said computer comprises program means configured to: acquire three-dimensional identification data of a bullet/shell of a firearm, displaying by means of said virtual reality viewer said bullet/shell reconstructed within a three-dimensional virtual environment, wherein said program means allow said operator to replicate his movements in said virtual environment in order to move the three-dimensional reconstruction of said bullet/shell in the virtual space.

20 Claims, 7 Drawing Sheets

(51) Int. Cl.
*G06F 3/04815* (2022.01)
*G06F 3/04842* (2022.01)
*G06F 3/04845* (2022.01)
*G06T 19/00* (2011.01)

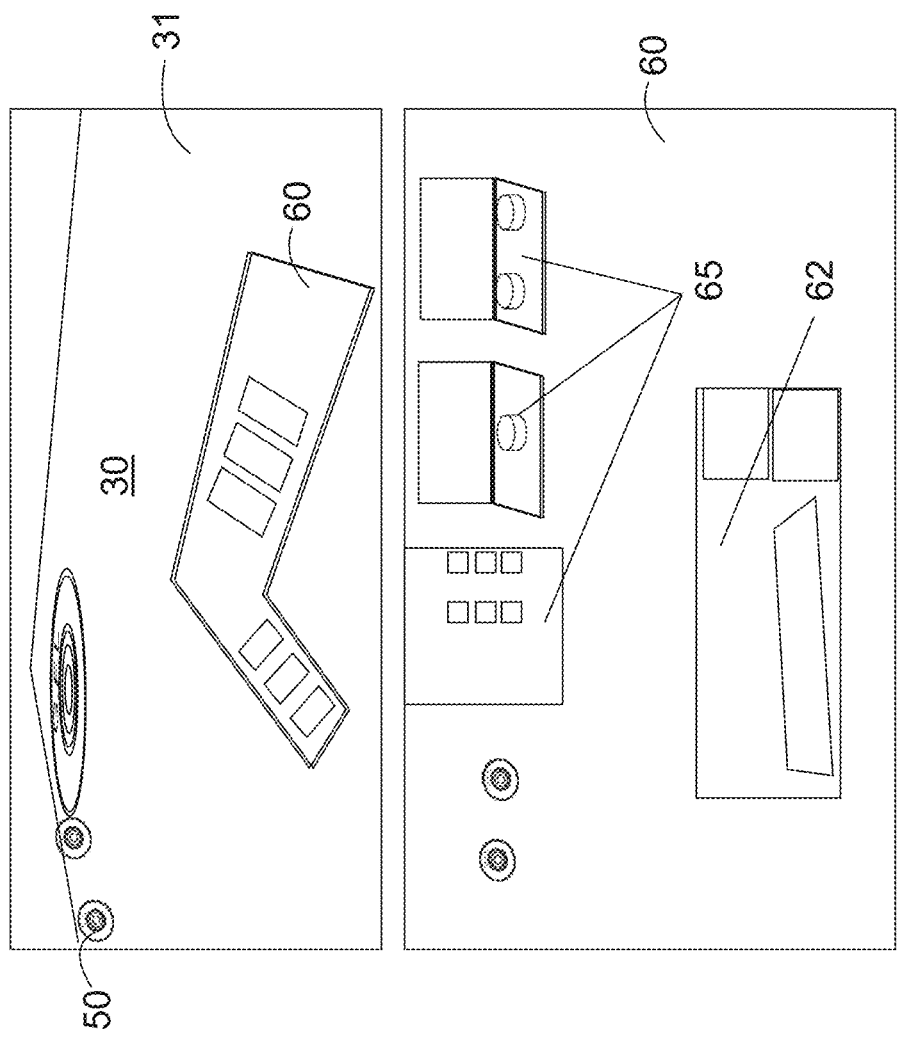

BALLISTIC ANALYSIS METHOD AND RELATED ANALYSIS SYSTEM

CROSS REFERENCE TO THE RELATED APPLICATIONS

This application is the national phase entry of International Application No. PCT/IB2022/060034, filed on Oct. 19, 2022, which is based upon and claims priority to Italian Patent Application No. 102021000027923, filed on Nov. 2, 2021, the entire contents of which are incorporated herein by reference.

TECHNICAL FIELD

The present invention relates to the area of the forensic ballistic analysis of firearms, and in particular it relates to a perfected ballistic analysis method and a related "immersive" system configured to implement said analysis method.

BACKGROUND

Ballistic analysis is known, also referred to as forensic ballistics.

Forensic ballistics is a science that studies and analyses the characteristics of firearms, cartridges, shells and bullets. It is based on the principle that all firearms have imperceptible differences due to their manufacturing process.

A crime scene commonly presents evidence such as bullets and shells, on the surface of which there are traces that allow the identification of the weapon through a procedure, typically based on comparison, aimed at identifying whether two different shells were fired by the same weapon. Some of the identification elements analysed are, for example, the streaks of the shell, the residues of the shot or even the imprint of the striker of the weapon.

Typically, a ballistic comparison is performed. This is based on the analysis of traces, which considers the anomalies left by the main components of the gun, such as: striker, extractor and those related to the barrel of the weapon. By examining the unique streaks left on bullets or shells, the connection with a specific weapon can be identified.

A first known method, still used, is based on the analysis carried out through the use of a comparative optical microscope. Typically, the shells found at the crime scene are compared with the shells fired with the suspect's gun. Identifying which weapon fired at the crime scene is a complicated task. One of the main problems is the limited availability of tools (hardware and software) used for ballistic comparisons. The comparative optical microscope is traditionally used, but it has limitations such as the repeatability of ballistic analyses on bullets and/or shells under examination. It is very complex to define step by step the sequential operation carried out by the forensic expert for ballistic comparison.

As a result, it is almost impossible to repeat with the same precision all the actions of the behaviour (rotations, translation, position lights, etc.) performed by the operator on the bullets/shells under examination. However, the reconstruction of the behaviour is a significant practice and very important in forensic science to be able to evaluate with high precision the results obtained from the ballistic comparison performed. The final assessment of a ballistic comparison is a further matter. This is because it depends on the experience of the forensic experts in the specific field. Mathematical approaches are known that envisage, for example, during a ballistic comparison on the same/similar geometric regions between two shells under examination. This is achieved by measuring the distance between the points in geometric space.

From the above it is clear that forensic ballistic analysis of firearms is a complicated and demanding process. Recently, new methods for more accurate comparisons have been proposed, which are based on the analysis of three-dimensionally reconstructed digital shells.

There is therefore a need to refine these methods of analysis by making them more accurate and, above all, faster. In fact, the response times of a ballistic analysis, carried out with known methodologies, are very long, thus implying the use of considerable resources and related costs.

SUMMARY

It is therefore the aim of the present invention to provide a ballistic analysis method that allows the aforementioned drawbacks to be overcome and that is able to guarantee significantly reduced response times.

It is another aim of the present invention to provide a ballistic analysis method that allows a more flexible overall exploration and analysis of data to be obtained, and with a higher resolution, thus providing greater accuracy of the examination and a faster decision making process.

These and other aims are achieved by a ballistic analysis method including the steps of:
  providing a virtual reality viewer shaped to be worn by an operator;
  providing a computer to which said virtual reality viewer is interfaced, wherein said computer comprises program means configured to:
  acquiring three-dimensional identification data of at least one bullet/shell fired by a firearm,
  displaying by means of said virtual reality viewer said bullet/shell reconstructed within a three-dimensional virtual environment,
  wherein said program means allow at least said operator to replicate his movements in said virtual environment in order to move the three-dimensional reconstruction of said bullet/shell in the virtual space.

The ballistic analysis method according to the present invention acquires the data of the shell reconstructed in 3D to explore them within an immersive viewing setting, such as that provided by a virtual reality viewer. In this way the data can be conveniently observed in their entirety and a broader comparison can be made. The user's movements made during observations, such as a change of point of view or the position of the object, can be more natural and intuitive, e.g. based on the rotation of the head and the gestures of the hands/body. The observed bullet/shell data can also be conveniently enlarged and viewed from viewpoints and even from within the bullet/shell. The proposed approach provides an in-depth understanding of the observed objects, allowing forensic experts to compare traces of shells and bullets more effectively and accurately. Below is a description of the user interface and interaction within the proposed virtual environment and the features of data analysis.

The method of ballistic analysis according to the present invention therefore proposes an innovative approach to the comparison of shells and bullets, based on three-dimensional graphic reconstruction and immersive observation. It allows the reconstructed 3D scenario to be observed through intuitive natural gestures, with an unprecedented level of detail, from any point of view and using visual aids.

In particular, several operators may wear a respective viewer interfaced to said processing unit, so that several operators can view by means of said virtual reality viewer said bullet/shell reconstructed within said three-dimensional virtual environment. In this way, the program means and related system allow a multi-operator mode to be configured, in which several users/operators can simultaneously access the same virtual environment (through different virtual reality viewers) and simultaneously perform the ballistic analysis of the same shell and/or bullet. This functionality occurs both in the case in which the operators are in the same work room and in remote mode, that is, in the case in which the operators are in different cities. This opens up a new way of effectively examining shapes, deformations and cavities of shells and/or bullets. The new approach presented is described in terms of user interface and interaction within the proposed virtual environment and data analysis features.

Advantageously, touch sensors associated with said virtual reality viewer and worn by said operator are provided, in which said sensors are associated with said program means and configured to interface with the three-dimensional reconstruction of the shell and/or bullet with a control panel displayed in said three-dimensional virtual environment.

Advantageously, said touch sensors comprise control elements selected from: gloves, joysticks or other handling elements. In this way, it is possible to manipulate in virtual form the objects and/or buttons present in the virtual world such as shells and/or bullets.

Touch sensors allow a representation of the hands displayed graphically within the virtual environment.

In particular, objects selected from the following are represented in said three-dimensional virtual environment:
   a control panel having a plurality of keys, knobs or virtual icons with which the operator can virtually interact;
   at least one display panel, in particular a plurality of display panels that can be positioned in the dimensional virtual environment that display specific information or graphic images of the shell/bullet;
   a worktop having a flat surface that acts as a support area to contain said control panel in addition to said 3D data display panels of the shell/bullet.

In particular, the selection of operator commands is supported by ray-casting to make the selection of actions more precise and facilitate the reach of buttons, keys and knobs.

In particular, said control panel comprises alignment and discrepancy enhancers, which make use of: colours (relevant to clearly identify elements that would otherwise not be visible); lighting (such as specially distributed light sources to improve distinctiveness); and the lighting effect (allowing, for example, the use of virtual torches useful for highlighting specific areas of objects). FIG. 6 shows examples of visual aids.

Advantageously, said program means allow said bullet/shell to be viewed in said virtual environment according to one of the following configurations:
   a first viewing configuration that defines at least one observation point in the virtual environment;
   a second viewing configuration that fixes the position of said bullet/shell in the virtual environment;
   a third enlarged viewing configuration of the bullet/shell and/or virtual environment;
   a fourth artificial stereoscopic three-dimensional enlarged viewing configuration;
   a fifth internal three-dimensional viewing configuration of the shell/bullet;
   a sixth viewing configuration that enables multiple objects to be viewed in the virtual environment.

The viewing configurations set out above can be adjusted by the operator.

In particular, the objects present in the virtual environment can be moved in the virtual environment itself through the movements of the operator that are replicated by means of the touch sensors worn by the latter.

In particular, the acquisition phase takes place through the extrapolation of data obtained by means of a 3D scanning tool. The point cloud of the object to be analysed (bullet/shell) is initially loaded into the system and represented through the use of computer graphics. The data viewing is set and optimized for three-dimensional and immersive viewing.

In particular, following the acquisition phase, a setting phase of the 3D point cloud and its position in the virtual environment is provided, set according to the size and shape of the real operating space.

In this way, this initial setting is relevant because it allows the operator to conveniently handle rotations, translations, and scaling operations of the displayed data, and set viewpoints to observe the dense point cloud or extracted 3D polygons. Once all the initial settings are processed, the virtual environment is created and all data are loaded. Any data that is not part of the shell and the bullet, are discarded due to being superfluous to forensic analysis.

BRIEF DESCRIPTION OF THE DRAWINGS

Further advantages and additional features of the present invention are highlighted with the following description of some construction forms, provided by way of non-limiting example, with reference to the attached drawings, in which:

FIGS. 2A and 2B show a schematic view of the virtual environment of FIG. 1, wherein the shell being analysed by means of virtual reality by the operator wearing the viewer is visible in two screens shown by FIG. 2A and FIG. 2B;

FIGS. 4A-4C show three screens;

DETAILED DESCRIPTION OF THE EMBODIMENTS

Figure 1:
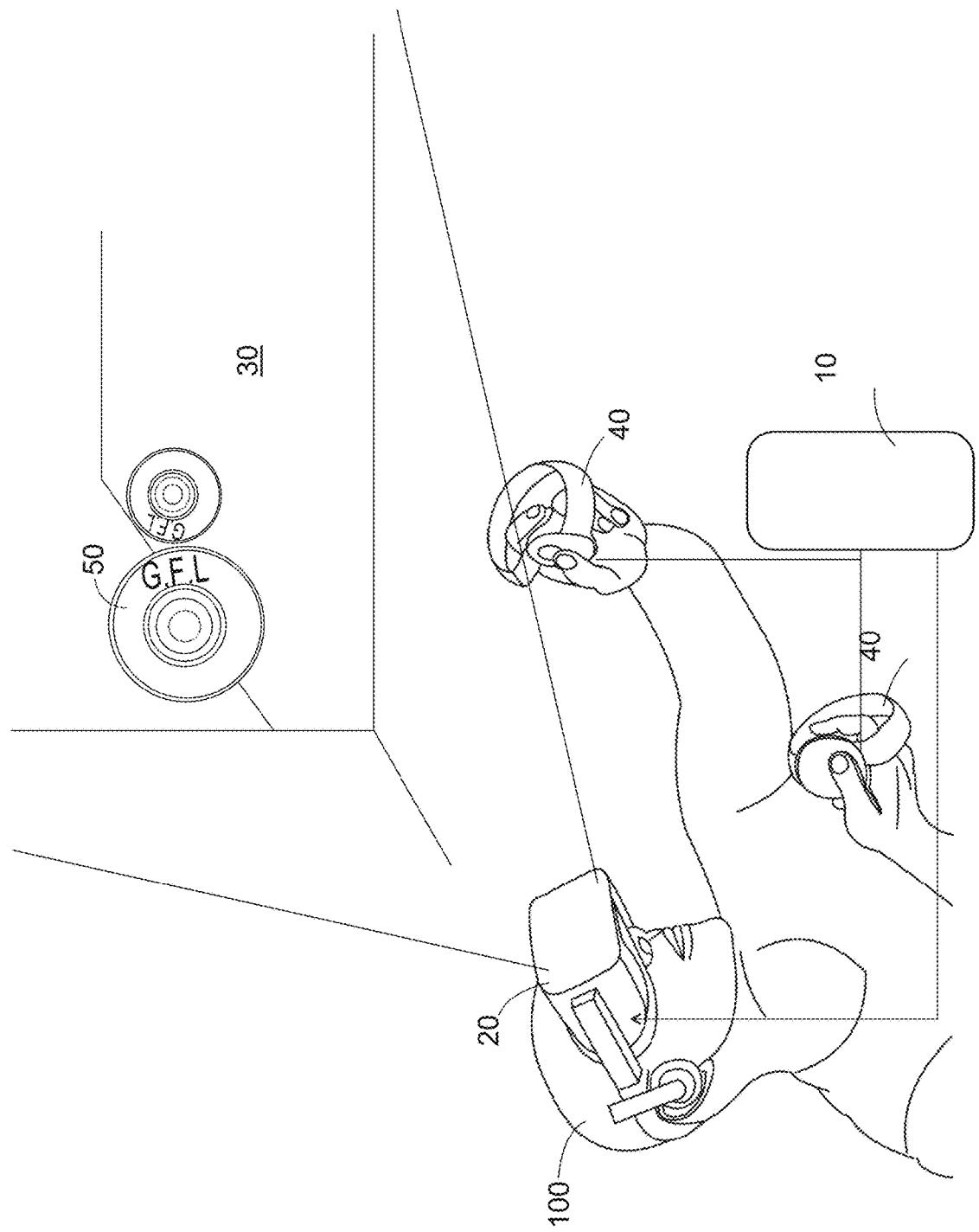
FIG. 1 is a schematic view of a user provided with a virtual reality viewer and a related virtual environment generated for ballistic analysis of a shell and/or bullet.

With reference to FIG. 1, a ballistic analysis method and related system according to the present invention are schematically shown.

In particular, the ballistic analysis method and related system comprise a virtual reality viewer 20, hereinafter also a VR viewer 20, shaped to be worn by an operator 100.

A processor 10, such as a computer, is provided and is connected to the virtual reality viewer 20. The computer 10 implements specific program means configured to acquire three-dimensional identification data of a bullet/shell 50 fired by a firearm to be analysed.

Figure 5:
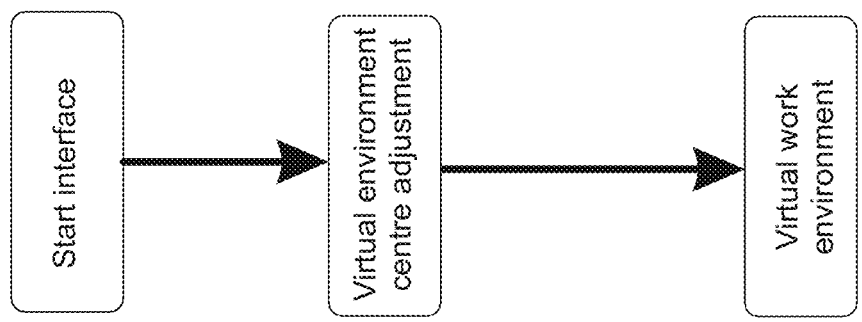
FIG. 5 represents a block diagram that identifies the phases of acquisition of identification data of the bullet/shell to be analysed and the virtual environment generation phases.

Following the acquisition phase, as shown in the block diagram in FIG. 5, the program means generate a virtual environment 30 viewable by means of said virtual reality viewer 20.

In the virtual environment 30 there is a three-dimensional reconstruction of the bullet/shell 50. The program means allow the operator to replicate his movements in said virtual environment 30 in order to move the three-dimensional reconstruction of said bullet/shell 50 in the virtual space.

The ballistic analysis method according to the present invention acquires the data of the bullet/shell 50 reconstructed in 3D to explore them within an immersive viewing setting, provided by a virtual reality viewer 20. In this way, the data can be conveniently observed in their entirety and a broader comparison can be made, as described in detail below. The movements of the user 100 made during observations, such as a change of point of view or the position of the object, are simple, natural and intuitive. For example, the operator can replicate in the virtual reality movements such as head rotation and hand/body gestures. The observed bullet/shell data can also be conveniently enlarged and viewed from viewpoints and even from within the bullet/shell.

Advantageously, as shown in FIG. 1, the operator 100 also wears touch sensors 40 on his hands associated with the virtual reality viewer 20. The touch sensors 40 or controllers are associated with the program means and configured to interface with the three-dimensional reconstruction of the bullet/shell 50 and/or with a control panel 60, or console, displayed in said three-dimensional virtual environment 30 (FIGS. 2A-2B). The touch sensors are reproduced and displayed graphically within the virtual environment 30. The virtual environment 30 then displays a reproduction of the hands 41 of the operator 100 (the screenshot shown by FIG. 3A). This is a function provided by modern VR viewers, providing consistent mapping between the actual movements of the fingers of the user 100, their 3D graphical representation and interaction with the buttons of the console 60.

In particular, in the three-dimensional virtual environment 30 objects are represented selected from the control panel 60 having a plurality of keys, knobs or virtual icons 65 with which the operator 100 can virtually interact by means of touch sensors 40. In particular, the touch sensors 40 are chosen from different types, as described below, and allow the interaction of the operator 100 with the shell 50 to move it and with the controls of the control panel 60 to operate them, as well as with other analysis tools.

Moreover, at least one display panel 62 (the screenshot shown by FIG. 2B) is provided, in particular a plurality of display panels that can be positioned in the dimensional virtual environment 30 that display specific information or graphic images of the bullet/shell.

The virtual representation of a worktop 31 with a flat surface that acts as a support area to contain the control panel 60 is also provided, in addition to said panels for displaying the 3D data of the bullet/shell.

The observation of the "ballistic theatre" through an immersive viewing system with the VR viewer 20 makes the user 100 feel like they are inside the represented environment. In addition, the actions of the user 100 are designed to replicate natural movements and gestures, such as walking, sitting and standing in the room, hand and finger movements, and head rotation. These natural movements support and enhance the sense of presence perceived by the user 100 in the represented environment.

In particular, several operators may wear a respective viewer interfaced to the processing unit 10, so that several operators can view by means of the virtual reality viewer 20 the bullet/shell reconstructed within said three-dimensional virtual environment 30.

The selection of the operator 100 controls is supported by ray-casting to make the selection of actions more precise and facilitate the reach of buttons, keys and knobs.

Figure 6:
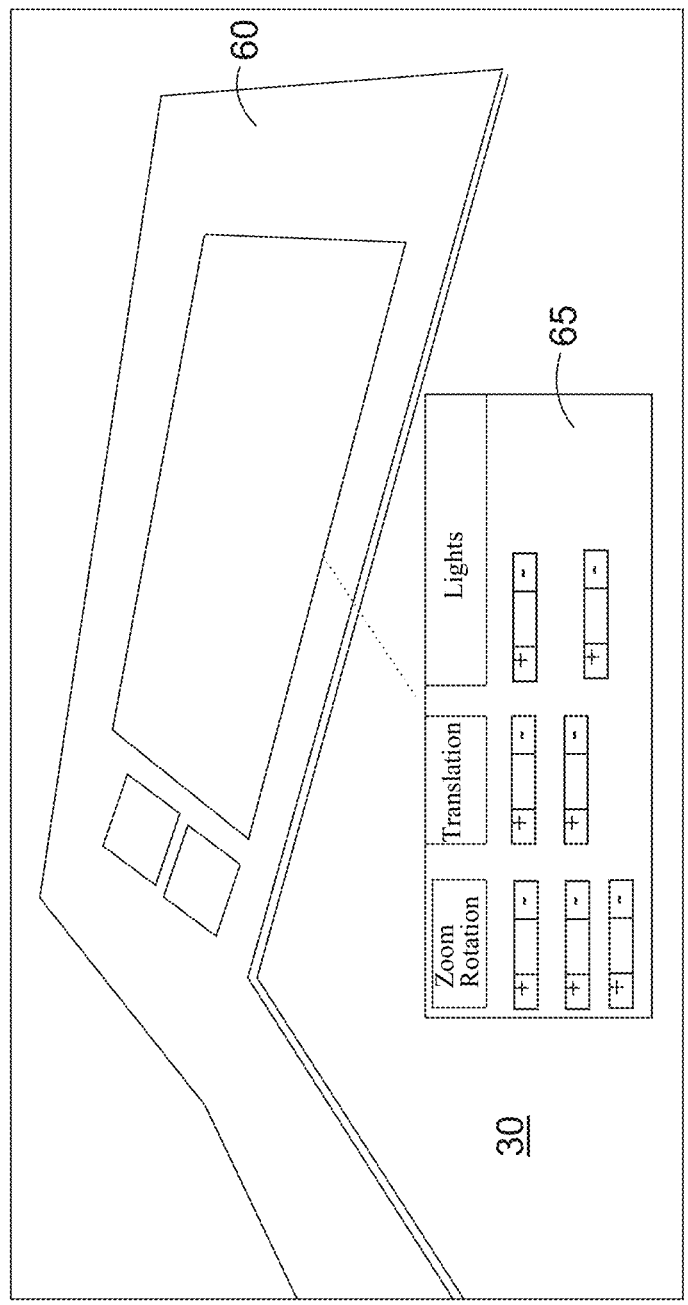
FIG. 6 is a schematic view of the virtual environment in which there is a control panel of the analysis tools that can be used by the operator within virtual reality.

All displayed objects, including those for interaction, such as the bottom of the console 60, the users' controllers and the 3D points of the bullet/shell, are placed in the room and calibrated according to the actual space that users have available in the real environment. All settings can be adjusted by the operator 100 on demand, including configuring the size, shape, and number of buttons on the dashboard. FIGS. 2A-2B and FIG. 6 show an example view of the virtual environment 30.

Figures 4A, 4B, 4C:
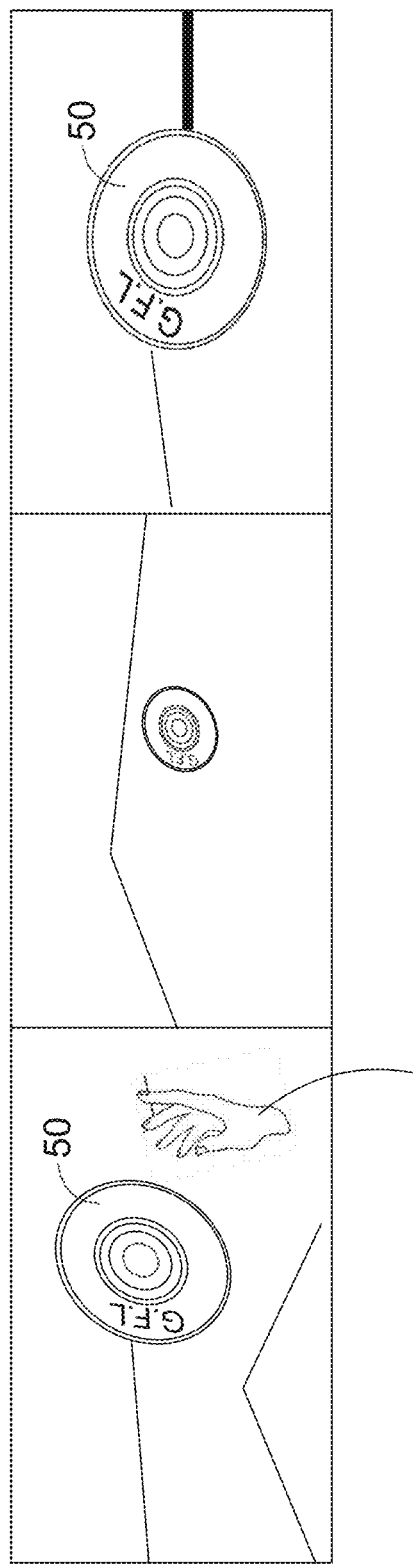
FIGS. 4A-4C show a view of the virtual environment and the bullet/shell under examination by means of visual comparison systems.

In particular, as shown in FIGS. 4A-4C, the control panel comprises alignment and discrepancy enhancers, which make use of: colours (relevant to clearly identify elements that would otherwise not be visible); lighting (such as specially distributed light sources to improve distinctiveness); and the lighting effect (allowing, for example, the use of virtual torches useful for highlighting specific areas of objects).

In a preferred embodiment, the program means are also configured to display the bullet/shell 50 in the virtual environment 30 according to one of the following configurations:

a first viewing configuration that defines at least one observation point in the virtual environment 30;

a second viewing configuration that fixes the position of said bullet/shell 50 in the virtual environment 30;

a third enlarged viewing configuration of the bullet/shell and/or virtual environment 30;

a fourth artificial stereoscopic three-dimensional enlarged viewing configuration;

a fifth internal three-dimensional viewing configuration of the bullet/shell;

a sixth viewing configuration that enables multiple objects to be viewed in the virtual environment 30.

Specifically, the first viewing configuration fixes one or more observation points in the virtual environment 30. Fixing specific observation points in the virtual world can facilitate comparison. In particular, the second viewing configuration fixes the position of the object. The correction of the position of the object can allow the operator 100 to walk around the bullet/shell and get a clearer overview, e.g. just as you would in the real world.

In particular, the third viewing configuration is an enlarged view. The observed objects can be enlarged and then observed in more detail.

In particular, the fourth viewing configuration is an artificial stereoscopic 3D display that can be set to increase depth awareness, for example through the use of hypo or hyper stereo settings.

In particular, the fifth viewing configuration is an internal view. Users can see the bullet/shell from the inside, an operation typically coupled with magnification, thus benefiting from seeing the object from a display setting that would be impossible to recreate in the real world.

In particular, the sixth viewing configuration allows multiple objects to be viewed. Exploration as well as comparison can also include multiple objects seen at the same time. For example, shells and/or bullets can be seen simultaneously inside each other.

Figure 7:
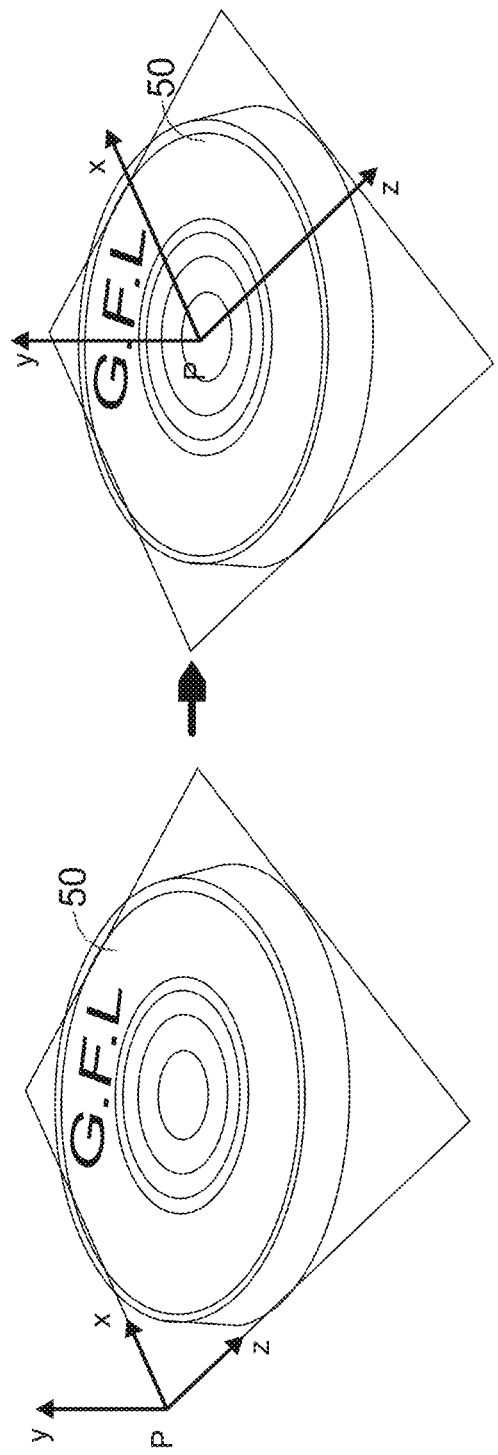
FIG. 7 is a perspective view of the comparison of the shell generated in the virtual environment.

The viewing configurations shown above can be adjusted by the operator 100, for example as shown in FIG. 7.

An additional viewing option can also be that of a virtual comparative microscope, thus associating the data as one would do by observing through a real optical microscope. This includes, for example, turning lights on and off, rotating bullets, and resizing the display. With this option, the 3D data are inserted into a worktop dedicated to the virtual comparative microscope and all the operations applied to the data are captured by special cameras and projected onto virtual panels made available for this task.

Compared to using the optical microscope, a forensic operator is no longer limited by the functionality that the instrument makes available. The objects observed are digital (e.g. point cloud of shells/bullets and their respective polygonal meshes), and they can be transformed into their appearance (resized, translated, coloured, etc.) to improve their visibility and without losing any detail and geometric structure and without the risk of being altered or damaged in the process.

With reference to other functionalities of the virtual environment 30, the objects present can be moved in the virtual environment 30 itself through the movements of the operator 100 which are replicated by means of the touch sensors 40 worn by the latter.

In particular, therefore, objects such as those representing panels, knobs, displays and data points, can be pulled, pushed, grasped, released, resized and rotated. Objects can then be repositioned and seen differently through the use of intuitive gestures of the hands and arms. They represent a relevant user 100 interaction element provided by the user 100 interface, which improves the quality of observation and minimizes the risk of having hidden or invisible elements.

In detail, as shown in the block diagram of FIG. 5, the acquisition phase takes place through the extrapolation of three-dimensional data of the object to be analysed 50 by means of a special 3D acquisition tool. The point cloud of the object to be analysed 50 is initially loaded into the system and represented through the use of computer graphics. The data viewing is set and optimized for three-dimensional and immersive viewing.

In particular, following the acquisition phase, a setting phase of the point cloud and its depth position in the virtual environment 30 is provided, set according to the size and shape of the real operating space. In this way, this initial setting is relevant because it allows the operator 100 to conveniently handle rotations, translations and scaling operations of the displayed data, and set viewpoints to observe the dense point cloud or extracted 3D polygons. Once all the initial settings are processed, the virtual environment 30 is created and all data are loaded. Any data that are not part of the bullet/shell 50, are discarded due to being superfluous to forensic analysis.

Once the system is set, the user 100 can start exploring the data and performing 3D comparisons. The outcome of this step is saved in a report, typically consisting of a file and an HTML page. The report includes: records of the actions performed, ballistic analysis, conclusions about whether the examined bullets were fired from the same weapon and the associated uncertainty, as well as the ability of the operator to perform ballistic analysis.

Compared to current forensic analysis tools, the method and system according to the present invention, allows the data analysis performed to be revisited and repeated at any time. In fact, it is possible to fully reproduce a past procedure with utmost accuracy by retracing all the steps that the forensic operator followed during the comparison performed.

The 3D forensic ballistics tool was developed considering the framework of the VR Oculus Rift S and Unity viewer 20. It consists of the following main components (FIG. 5):

Startup interface: a new project can be created by adding the name and selecting the path to the folder that contains the point clouds of the shells and/or bullets that need to be compared or an existing project can be loaded. Different point clouds can be loaded (a number greater than or equal to 1) into the project;

Setting the centre of the environment: thanks to this functionality the forensic operator 100 is able to put himself at the centre of the virtual environment 30 simply by moving the worktop to a point of interest via a joystick. As a result, all instruments for 3D forensic ballistic analysis and comparison of bullets/shells 50 will be positioned according to the work plan. This function is of considerable importance because it allows the centre of the virtual environment 30 to be adapted according to the size of the room in which the VR viewer 20 will be used. In a different scenario the use of the tool will be complicated due to the possible presence of objects such as tables, chairs, furniture, etc. in the real world.

Figures 3A, 3B, 3C:
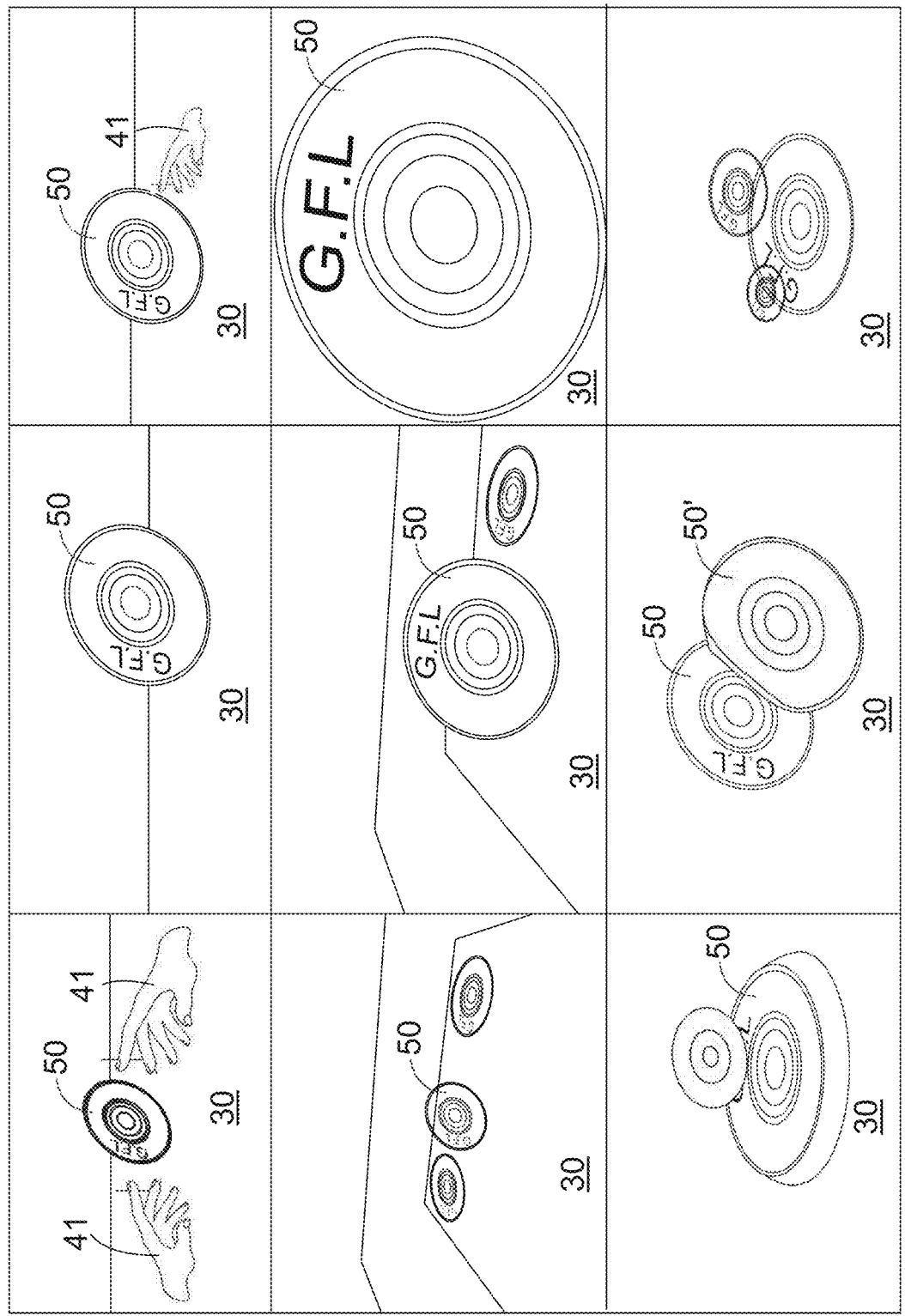
FIGS. 3A-3C show a view of the virtual environment of FIG. 1, wherein the shell being examined is visible in the respective three screens shown by FIG. 3A, FIG. 3B, and FIG. 3C, according to different viewing perspectives, controllable by the operator immersed in the reproduced virtual reality.

Working environment: contains several control panels 60 through which the point clouds can be handled (the screenshot shown by FIG. 3C). It allows a preliminary analysis of the bullets/shells 50 to be carried out using only the controllers 40 and in-depth analyses to be carried out taking advantage of the different features available in the virtual environment 30 simulating the working structure of the comparative optical microscope used by security forces.

After analysis, an HTML report can be generated containing every operation performed by the forensic operator 100. This is essential to verify the quality of the analysis and at the same time have the possibility to save the status of the comparison. Afterwards, the analysis can be carried out. This represents a substantial difference from the comparative optical microscope used by security forces. For example, suppose the forensic operator accidentally hit an object or an involuntary movement causes damage to the comparative microscope during a forensic analysis; this could result in a change in the position of the bullets, compromising the analysis and, in the worst case scenario, the operator will have to repeat the comparison. With this new tool the forensic operator has the possibility to restore the operations performed previously, and thanks to the possibility to save the status of the operations, any project created in the past can be restored and the analysis continued.

In other aspects, the environment, or virtual "room" 30, consists of a worktop 31 that contains the main operations that the forensic operator can perform on the incoming bullets. the screenshots shown by FIGS. 2A-2B show the virtual environment 30. The forensic operator 100 can pick up the bullets/shells 50 from the panel using only the controllers 40. Operations such as rotating, resizing, and translating can be used to perform an initial analysis, simply by using the movement of the hand 41. This function can be constrained to find common shapes or for detailed analysis of input data, as shown in the screenshots shown by FIGS. 3A-3C.

In a first panel, the operator can select the point cloud to which to apply the operations listed in the other panels.

In detail, these panels include functions such as:

Rotation and Translation panel: the rotation and translation can be blocked on different axes of the point cloud chosen by the forensic operator. This is done to analyse the point cloud in detail in order to block involuntary movements that can lead to excluding or not seeing elements that characterize the data being examined.

Pins panel: The rotation operation is performed relative to the centre of the point cloud. This constraint can be changed by using pin objects. Four different pins were considered: Up, Down, Left and Right. When the operator selects one (or more) of these buttons with the virtual hand, the colour of the corresponding pin in FIG. 7 changes and will be placed on one of the four edges of the bullet/shell 50 to constrain the rotation movements with respect to the pin coordinates. In other words, all rotations will be carried out according to the new reference point chosen by the operator.

Overlapping bullets/shells: point clouds ca be overlaid to search for common elements between bullets/shells (the screenshot shown by FIG. 3C). The forensic operator touches the buttons with his virtual hands 41 and the bullet/shell 50 will overlap the bullet/shell 50' or vice versa.

Images can be captured and saved that represent the current scene seen by the operator with his own 20 viewer. This is done by pressing a button on the controller 40, in order to save information that may contain important details for the final evaluation of the bullets/shells 50 being analysed.

In addition, the operator 100 can save or restore the position of the bullets/shells 50. When the forensic operator taps the "Save As . . . " button, a new control panel appears where the elements that have been analysed in the bullet/shell can be selected (e.g. chamber impression, striker impression, etc.). The HTML report that will be created after this operation will contain all these data. For example, if the operator has saved 5 images of the striker impression, the HTML report will show them grouped by type (in this case with respect to the striker impression). Finally, the original position of the bullets can be restored when the operator presses the "Restore bullet position" button.

The analysis of the bullets/shells 50 can be improved with the use of a torch object. The torch turns on when the operator presses a dedicated button on the controller 40. Different light colours and other features can be set via the "Setting torch parameters" control panel. Finally, the ambient light can also be changed via a "Change room light" panel.

A last important feature available is the virtual comparative optical microscope, simulated through a worktop 31 (FIG. 6), a table dedicated to the positioning of the shells/bullets 50 under analysis and two panels. When the forensic operator touches the dedicated knob with virtual hands 41 the analysis begins with the virtual microscope and the bullets/shells 50 will be projected into the respective two panels. Specifically, the shells/bullets 50 are moved to a dedicated area. A camera and a light (not visible to the forensic operator) are placed on each shell/bullet 50 under analysis. The cameras will be used to capture and project the status of the shells/bullets 50 in the respective panels. The light from each camera has been added to better simulate the real functionality of the comparative optical microscope currently used by security forces. Once the shells/bullets 50 are positioned, the worktop 31 (the screenshot shown by FIG. 2A) changes as shown in FIG. 6, allowing an activation of the various functions, such as zoom, rotation, translation and light necessary for an accurate ballistic comparison.

In fact, for these last operations (zoom, translation, etc.), the respective cameras will be "manipulated". In this way, if a shell/bullet 50 needs to be enlarged, the respective camera will be moved up or down. In detail, the "Zoom and Rotation" operation allows the bullets to be resized or rotated, see for example the screenshots shown by FIGS. 4A-4C. The values "0.001" and "0.5" are used to set the scale and rotation parameters of the camera, respectively. These values can be increased or decreased by the user 100 using the "+" and buttons. Through the "Lights" panel the "spot angle" of the lights associated with the respective cameras can be turned on, off and set. All of these operations are performed using only the controllers 40. To activate and deactivate each of the operations described, the virtual hand 41 of the forensic expert must press the corresponding "On/Off" button ("On/Off" of the Zoom and Rotation panel, "On/Off" of the Translation panel, etc.). All projected images of the shells/bullets 50 in the respective panels can be saved and reported in the HTML report. At the end of the analysis with the virtual comparative microscope, the operator 100 through a dedicated knob will restore the entire working environment: the worktop will be returned to its original shape and the shells/bullets will be moved to the starting panel.

This analysis method refines the methods of ballistic analysis according to the prior art by proposing a new approach to ballistic comparison that is based on graphic reconstruction and immersive visual observation, such as that provided by a VR viewer 20. Users can examine the shapes of reconstructed bullets/shells three-dimensionally through intuitive natural gestures, from any point of view (including enlarged internal views), while having sets of visual aids that help compare data. The benefits are: more flexible and natural data exploration, higher resolution, greater examination accuracy, and faster decision-making.

The above description of one or more specific embodiments is able to show the invention from the conceptual point of view so that others, using the prior art, will be able to modify and/or adapt the embodiments in various applications without any further research and without departing from the inventive concept, and, therefore, it is understood that such adaptations and modifications will be considered as equivalents of the specific embodiment. The means and materials to carry out the various functions described may be of various kinds without departing from the scope of the invention. It is understood that the expressions or terminology used are for purely descriptive purposes and thus non-limiting.

What is claimed is:

1. A forensic ballistic analysis method comprising steps of:
   providing a virtual reality viewer shaped to be worn by an operator;
   providing a computer connected to the virtual reality viewer, wherein the computer comprises program means configured to:
   acquire three-dimensional identification data of a bullet/shell fired by a firearm, display, by means of the virtual reality viewer, the bullet/shell reconstructed within a three-dimensional virtual environment,
wherein the program means allow the operator to replicate movements of the operator in the three-dimensional virtual environment in order to move a three-dimensional reconstruction of the bullet/shell in a virtual space.

2. The forensic ballistic analysis method according to claim 1, wherein touch sensors associated with the virtual reality viewer and worn by the operator are provided, wherein the touch sensors are associated with the program means and configured to interface with the three-dimensional reconstruction of the bullet/shell and/or with a control panel displayed in the three-dimensional virtual environment.

3. The forensic ballistic analysis method according to claim 2, wherein a plurality of operators are allowed to wear the virtual reality viewer interfaced to a processing unit, respectively, wherein the plurality of operators are allowed to view, by means of the virtual reality viewer, the bullet/shell reconstructed within the three-dimensional virtual environment.

4. The forensic ballistic analysis method according to claim 2, wherein in the three-dimensional virtual environment, objects selected from the following are represented:
   the control panel having a plurality of keys, a plurality of knobs, or a plurality of virtual icons, wherein the operator is allowed to interact virtually with the control panel;
   at least one display panel, wherein a plurality of display panels are allowed to be positioned in the three-dimensional virtual environment to display specific information or graphic images of the shell/bullet;
   a worktop having a flat surface, wherein the worktop acts as a support area to contain the control panel in addition to the plurality of display panels of the shell/bullet.

5. The forensic ballistic analysis method according to claim 2, wherein the program means enable the bullet/shell to be viewed in the three-dimensional virtual environment according to one of the following configurations:
   a first viewing configuration configured to define at least one observation point in the three-dimensional virtual environment;
   a second viewing configuration configured to fix a position of the bullet/shell in the three-dimensional virtual environment;
   a third enlarged viewing configuration of the bullet/shell and/or the three-dimensional virtual environment;
   a fourth artificial stereoscopic three-dimensional enlarged viewing configuration;
   a fifth internal three-dimensional viewing configuration of the bullet/shell;
   a sixth viewing configuration configured to enable a plurality of objects to be viewed in the three-dimensional virtual environment.

6. The forensic ballistic analysis method according to claim 2, wherein objects present in the three-dimensional virtual environment are allowed to be moved in the three-dimensional virtual environment itself by means of the movements of the operator, wherein the movements are replicated by means of the touch sensors worn by the operator.

7. The forensic ballistic analysis method according to claim 1, wherein a plurality of operators are allowed to wear the virtual reality viewer interfaced to a processing unit, respectively, wherein the plurality of operators are allowed to view, by means of the virtual reality viewer, the bullet/shell reconstructed within the three-dimensional virtual environment.

8. The forensic ballistic analysis method according to claim 7, wherein in the three-dimensional virtual environment, objects selected from the following are represented:
   a control panel having a plurality of keys, a plurality of knobs, or a plurality of virtual icons, wherein the operator is allowed to interact virtually with the control panel;
   at least one display panel, wherein a plurality of display panels are allowed to be positioned in the three-dimensional virtual environment to display specific information or graphic images of the shell/bullet;
   a worktop having a flat surface, wherein the worktop acts as a support area to contain the control panel in addition to the plurality of display panels of the shell/bullet.

9. The forensic ballistic analysis method according to claim 7, wherein the program means enable the bullet/shell to be viewed in the three-dimensional virtual environment according to one of the following configurations:
   a first viewing configuration configured to define at least one observation point in the three-dimensional virtual environment;
   a second viewing configuration configured to fix a position of the bullet/shell in the three-dimensional virtual environment;
   a third enlarged viewing configuration of the bullet/shell and/or the three-dimensional virtual environment;
   a fourth artificial stereoscopic three-dimensional enlarged viewing configuration;
   a fifth internal three-dimensional viewing configuration of the bullet/shell;
   a sixth viewing configuration configured to enable a plurality of objects to be viewed in the three-dimensional virtual environment.

10. The forensic ballistic analysis method according to claim 7, wherein objects present in the three-dimensional virtual environment are allowed to be moved in the three-dimensional virtual environment itself by means of the movements of the operator, wherein the movements are replicated by means of touch sensors worn by the operator.

11. The forensic ballistic analysis method according to claim 1, wherein in the three-dimensional virtual environment, objects selected from the following are represented:
   a control panel having a plurality of keys, a plurality of knobs, or a plurality of virtual icons, wherein the operator is allowed to interact virtually with the control panel;
   at least one display panel, wherein a plurality of display panels are allowed to be positioned in the three-dimensional virtual environment to display specific information or graphic images of the shell/bullet;
   a worktop having a flat surface, wherein the worktop acts as a support area to contain the control panel in addition to the plurality of display panels of the shell/bullet.

12. The forensic ballistic analysis method according to claim 11, wherein a selection of operator commands is supported by ray-casting to make a selection of actions more precise and facilitate a reach of buttons, the plurality of keys, and the plurality of knobs.

13. The forensic ballistic analysis method according to claim 12, wherein the program means enable the bullet/shell to be viewed in the three-dimensional virtual environment according to one of the following configurations:

a first viewing configuration configured to define at least one observation point in the three-dimensional virtual environment;
a second viewing configuration configured to fix a position of the bullet/shell in the three-dimensional virtual environment;
a third enlarged viewing configuration of the bullet/shell and/or the three-dimensional virtual environment;
a fourth artificial stereoscopic three-dimensional enlarged viewing configuration;
a fifth internal three-dimensional viewing configuration of the bullet/shell;
a sixth viewing configuration configured to enable the plurality of objects to be viewed in the three-dimensional virtual environment.

14. The forensic ballistic analysis method according to claim 11, wherein the control panel comprises alignment and discrepancy enhancers, wherein the alignment and discrepancy enhancers make use of: colours, lighting, and a lighting effect.

15. The forensic ballistic analysis method according to claim 14, wherein the program means enable the bullet/shell to be viewed in the three-dimensional virtual environment according to one of the following configurations:
a first viewing configuration configured to define at least one observation point in the three-dimensional virtual environment;
a second viewing configuration configured to fix a position of the bullet/shell in the three-dimensional virtual environment;
a third enlarged viewing configuration of the bullet/shell and/or the three-dimensional virtual environment;
a fourth artificial stereoscopic three-dimensional enlarged viewing configuration;
a fifth internal three-dimensional viewing configuration of the bullet/shell;
a sixth viewing configuration configured to enable the plurality of objects to be viewed in the three-dimensional virtual environment.

16. The forensic ballistic analysis method according to claim 11, wherein the program means enable the bullet/shell to be viewed in the three-dimensional virtual environment according to one of the following configurations:
a first viewing configuration configured to define at least one observation point in the three-dimensional virtual environment;
a second viewing configuration configured to fix a position of the bullet/shell in the three-dimensional virtual environment;
a third enlarged viewing configuration of the bullet/shell and/or the three-dimensional virtual environment;
a fourth artificial stereoscopic three-dimensional enlarged viewing configuration;
a fifth internal three-dimensional viewing configuration of the bullet/shell;
a sixth viewing configuration configured to enable the plurality of objects to be viewed in the three-dimensional virtual environment.

17. The forensic ballistic analysis method according to claim 1, wherein the program means enable the bullet/shell to be viewed in the three-dimensional virtual environment according to one of the following configurations:
a first viewing configuration configured to define at least one observation point in the three-dimensional virtual environment;
a second viewing configuration configured to fix a position of the bullet/shell in the three-dimensional virtual environment;
a third enlarged viewing configuration of the bullet/shell and/or the three-dimensional virtual environment;
a fourth artificial stereoscopic three-dimensional enlarged viewing configuration;
a fifth internal three-dimensional viewing configuration of the bullet/shell;
a sixth viewing configuration configured to enable a plurality of objects to be viewed in the three-dimensional virtual environment.

18. The forensic ballistic analysis method according to claim 1, wherein objects present in the three-dimensional virtual environment are allowed to be moved in the three-dimensional virtual environment itself by means of the movements of the operator, wherein the movements are replicated by means of touch sensors worn by the operator.

19. The forensic ballistic analysis method according to claim 1, wherein as a result of the steps, a phase is provided of setting a point cloud and a related depth position in the three-dimensional virtual environment set according to a size and a shape of a real operating space.

20. A forensic ballistic analysis system configured to implement the forensic ballistic analysis method according to claim 1.

* * * * *